United States Patent

Masaki et al.

[11] Patent Number: 5,698,311
[45] Date of Patent: Dec. 16, 1997

[54] MAGNETIC RECORDING MEDIUM

[75] Inventors: Kouichi Masaki; Toshihiko Miura, both of Kanagawa, Japan

[73] Assignee: Fuji Photo Film Co., Ltd., Kanagawa-ken, Japan

[21] Appl. No.: 674,126

[22] Filed: Jul. 1, 1996

[30] Foreign Application Priority Data

Jul. 4, 1995 [JP] Japan .................. 7-189753

[51] Int. Cl.$^6$ .................................. G11B 5/706
[52] U.S. Cl. .............. 428/328; 428/332; 428/694 BA; 428/694 BS; 428/900
[58] Field of Search ..................... 428/328, 332, 428/694 BA, 694 BS, 900

[56] References Cited

U.S. PATENT DOCUMENTS 5,137,783  8/1992  Tanihara et al. ............... 428/407
5,466,306  11/1995  Mishima et al. ............... 148/306

Primary Examiner—Stevan A. Resan
Attorney, Agent, or Firm—Brinks Hofer Gilson & Lione

[57] ABSTRACT

A magnetic recording medium comprising a nonmagnetic support having provided thereon at least a magnetic layer containing ferromagnetic metal particles, wherein the magnetic layer has a coercive force of 2,000 to 3,000 Oe and a Bm of 3,800 to 5,500 G, the ferromagnetic metal particles has an average major axis length of 0.05 to 0.12 μm and an average aspect ratio of 4.0 to 10.0, the average number of crystallites constituting the ferromagnetic metal particles per particle is from 2.0 to 5.0, and the crystallites has an average aspect ratio of 1.0 to 2.0.

5 Claims, 1 Drawing Sheet

MAGNETIC RECORDING MEDIUM

FIELD OF THE INVENTION

The present invention relates to a magnetic recording medium, e.g., a magnetic tape. More particularly, the present invention relates to a coating type magnetic recording medium which has a magnetic layer formed by coating a nonmagnetic support with a magnetic coating fluid containing ferromagnetic metal particles and a binder as major components, and which is excellent in sensitivity and S/N in a short-wavelength region.

BACKGROUND OF THE INVENTION

The technique of magnetic recording has excellent advantages over other recording techniques, for example, that a recording medium can be repeatedly used, that signal conversion into electronic signals is so easy that a magnetic-recording apparatus can be combined with peripheral devices to construct a system, and that signals can be easily revised. Due to such advantages, magnetic recording has been widely utilized in various fields including video, audio, and computer applications.

With respect to recording media, a further improvement in recording density, reliability and durability has been always desired so as to cope with desires for size reduction in appliances, improvement in the quality of reproduced signals, elongation of recording time, and an increase of recording capacity.

For example, magnetic recording media for use in audio and video applications have come to be required to have suitability for the recording/reproduction of signals having an even shorter wavelength than in conventional systems and to be excellent in reliability and durability even at an increased head/medium relative speed, in order to cope with practical use of the digital recording system attaining improved sound and image quality and with the development of a video recording system for high-definition television.

Also, in computer applications also, it is desired to develop a large-capacity digital recording medium for storing an increasing quantity of data therein.

For the attainment of a higher recording density in coating type magnetic recording media, various methods have been investigated and proposed, for example, from the standpoint of obtaining a magnetic layer having improved magnetic characteristics by replacing conventional magnetic iron oxide particles with magnetic particles of iron or an alloy mainly comprising iron or by using magnetic particles with improved magnetic characteristics, e.g., finer magnetic particles, and improving the ability of these magnetic particles to fill a magnetic layer and be oriented, and from the standpoints of improving the dispersibility of ferromagnetic particles and enhancing the surface properties of a magnetic layer.

For example, a technique of using ferromagnetic metal particles or a hexagonal ferrite as ferromagnetic particles in order to enhance magnetic characteristics is disclosed in, e.g., JP-A-58-122623 (the term "P-A" as used herein means an "unexamined published Japanese patent application"), JP-A-6174137, JP-B-62-49656 (the term "JP-B" as used herein means an "examined Japanese patent publication"), JP-B-60-50323, and U.S. Pat. Nos. 4,629,653, 4,666,770, and 4,543,198.

JP-A-1-18961 discloses ferromagnetic metal particles having a major axis length of 0.05 to 0.2 µm, an aspect ratio of 4 to 8, a specific surface area of 30 to 55 $m_2$/g, a coercive force of 1,300 Oe or more, and a saturation magnetization of 120 emu/g or more. This technique is intended to provide fine metal particles having a small specific surface area.

JP-A-60-11300 and JP-A-60-21307 disclose a process for producing fine acicular crystals of α-iron oxyhydroxide which are suitable for use in producing ferromagnetic particles, in particular, ferromagnetic metal particles. The latter reference discloses that ferromagnetic metal particles having an Hc of 1,450 to 1,600 Oe and a σs of 142 to 155 emu/g are produced from goethite having a major axis length of 0.12 to 0.25 µm and an aspect ratio of 6 to 8.

JP-A-6-340426 and JP-A-7-109122 disclose monodisperse spindle-shaped hematite particles obtained from hematite nuclei, iron hydroxide, and specific ions and exceedingly fine ferromagnetic particles obtained by reducing the hematite particles.

It has also been proposed to use various surfactants (as disclosed in, e.g., JP-A-52-156606, JP-A-53-15803, JP-A-53116114) and various reactive coupling agents (as disclosed in, e.g., JP-A-49-59608, JP-A-56-58135, JP-B-62-28489) for enhancing the dispersibility of ferromagnetic particles.

JP-A-1-239819 discloses magnetic particles obtained by successively adhering a boron compound and an aluminum compound or an aluminum compound and a silicon compound to the surface of magnetic iron oxide particles. This prior art technique is intended to improve magnetic characteristics and dispersibility.

JP-A-7-22224 discloses ferromagnetic metal particles in which the content of Group 1a elements of the Periodic Table is 0.05% by weight or less and which may contain aluminum and a rare earth element in amounts of 0.1 to 30% and from 0.1 to 10%, respectively, in terms of the amount of the atoms thereof based on the total amount of all metallic elements and may have a content of residual Group 2a elements of the Periodic Table of 0.1% by weight or less. This technique is intended to provide a high-density magnetic recording medium having good storage stability and satisfactory magnetic characteristics.

Furthermore, a technique of treating the surface of a magnetic layer after coating and drying for improving the surface properties of the magnetic layer has been proposed (as disclosed in, e.g., JP-B-60-44725).

With respect to metal particles for magnetic recording, an acicular particle shape is employed to impart shape anisotropy to thereby obtain a desired coercive force. It is known that for attaining higher-density recording, ferromagnetic metal particles should be reduced into finer particles so as to obtain a medium having diminished surface roughness. However, the metal particles for use in magnetic recording tend to have a lower aspect ratio with decreasing particle size and, as a result, come to be incapable of having a desired coercive force. A DVC system in which video signals are recorded as digital signals has been proposed recently, for which a high-performance ME tape and a high-performance MP tape are used. Since the MP tape for use in DVC has a coercive force of 2,000 Oe or more, it is necessary to employ fine ferromagnetic metal particles having a high coercive force and an excellent particle size distribution. Moreover, since DVC is a recording system in which signals are recorded over signals which have been recorded, the ferromagnetic metal particles for use therein are required to have satisfactory overwriting characteristics.

SUMMARY OF THE INVENTION

An object of the present invention is to provide a magnetic recording medium which has satisfactory short-wavelength output and S/N and excellent overwriting characteristics and is applicable to a high-density digital recording system.

Another object of the present invention is to provide a means for further improving the uniformity in performance and quality of the magnetic recording medium.

These and other objects of the present invention have been accomplished with a magnetic recording medium comprising a nonmagnetic support having provided thereon at least a magnetic layer containing ferromagnetic metal particles, wherein the magnetic layer has a coercive force of 2,000 to 3,000 Oe and a Bm of 3,800 to 5,500 G; the ferromagnetic metal particles has an average major axis length of 0.05 to 0.12 μm and an average aspect ratio of 4.0 to 10.0; the average number of crystallites constituting the ferromagnetic metal particles per particle is from 2.0 to 5.0; and the crystallites has an average aspect ratio of 1.0 to 2.0. The magnetic recording medium may have a nonmagnetic layer mainly comprising inorganic nonmagnetic particles and a binder between the nonmagnetic support and the magnetic layer.

BRIEF DESCRIPTION OF THE DRAWINGS

In FIGS. 1 and 2, ferromagnetic metal particle 1 and crystallite 2 are shown.

DETAILED DESCRIPTION OF THE INVENTION

In the present invention, the term "ferromagnetic metal particle" means a particle defined by the largest contour. The average major axis length of ferromagnetic metal particles means the average of the lengths of the major (longer) axes of the individual particles. On the other hand, the average minor axis length thereof means the average of the lengths of the minor (shorter) axes of the individual particles. The average aspect ratio thereof means the value obtained by dividing the average major axis length by the average minor axis length.

The crystallites of such ferromagnetic metal particles mean the individual crystals of which the metal particles are composed.

Extensive studies were made by the present inventors on various processes for producing fine ferromagnetic metal particles. Although it has been difficult to obtain ferromagnetic metal particles having a high coercive force and a reduced content of high-coercive-force components, the present inventors have succeeded in obtaining ferromagnetic metal particles combining a high Hc and an improved Hc distribution by directing attention to metal crystallites and controlling the same. In conventional processes, attainment of a higher Hc and improvement of Hc distribution would be insufficient because the starting material used has an insufficiently regulated shape and the resulting ferromagnetic metal particles are not regulated in the number and shape of the crystallites constituting each ferromagnetic metal particle. The present invention has been achieved by subjecting a starting material having uniformity in particle size to a sintering prevention treatment and regulating the number of metal (e.g., Fe) nuclei formed from a metal oxide (e.g., FeO) during reduction. Monodisperse goethite or monodisperse hematite can be used as the starting material.

The starting material preferably has an average major axis length of 0.05 to 0.20 μm and an aspect ratio of 4 to 15. If a starting material having an average major axis length smaller than 0.05 μm is used, it is difficult to regulate Hc and σs to values within the respective desired ranges. If a starting material having an average major axis length larger than 0.20 μm is used, the ferromagnetic metal particles yielded therefrom are too coarse, so that it is difficult to produce a magnetic tape having reduced surface roughness necessary for high-density recording. If a starting material having an aspect ratio lower than 4 is used, the ferromagnetic metal particles yielded therefrom are unusable for a high-density recording medium because they have a low coercive force and are less suitable for magnetic orientation, which is performed for improving the properties of a magnetic tape. If a starting material having an aspect ratio higher than 15 is used, it is difficult to regulate the aspect ratio of crystallites, resulting in a widened distribution of coercive force. In particular, the proportion of high-coercive-force components increases, resulting in impaired overwriting characteristics.

Means for regulating the ferromagnetic metal particles for use in the present invention and regulating the crystallites of the particles are not particularly limited. Examples thereof include the following methods (1) and (2).

(1) A specific elemental composition mainly for the inner part of the ferromagnetic metal particles is specified.

In particular, in the case of ferromagnetic metal particles mainly comprising Fe, specific minor elements which interact with Fe are used. Preferred examples of the minor elements include Ca, Co, Ni, and Cr. These minor elements are preferably added during the preparation of goethite or hematite and/or after the preparation thereof by means of a surface treatment.

(2) In the technique of producing ferromagnetic metal particles by the reduction of an oxide of a ferromagnetic metal element, conditions for pretreatments performed prior to the reduction, e.g., conditions for the dehydration or annealing of goethite, are selected and conditions for the reduction, e.g., temperature, reducing gas, and reduction time, are selected.

For example, conditions for each step of the treatment of goethite containing minor elements and obtained according to (1) above are as follows.

Dehydration may be conducted with a rotary type electric furnace in a nitrogen atmosphere at 250° to 400° C., preferably 300° to 400° C., for 0.5 to 2 hours, preferably 0.5 to 1 hour. Annealing may be conducted with a stationary reducing furnace in a nitrogen atmosphere at 500° to 800° C., preferably 550° to 700° C., for 1 to 5 hours, preferably 2 to 3 hours. Between the dehydration and the annealing, a step of washing the resulting hematite with water to remove soluble alkali metals may be conducted.

Reduction may be conducted with a stationary reducing furnace in such a manner that the iron oxide is first reduced in a hydrogen atmosphere at 350° to 500° C., preferably 425° to 480° C., for 0.25 to 1 hour, preferably 0.25 to 0.5 hours, and then heated in a nitrogen atmosphere at 450° to 650° C., preferably 500° to 600° C., for 0.5 to 3 hours, preferably 1 to 2 hours, and further then reduced in a pure hydrogen atmosphere at that temperature for 3 to 5 hours.

The completion of the reduction is determined by measuring the moisture content of the discharged gas with a dew-point hygrometer.

For producing the ferromagnetic metal particles described above, known methods may be used such as the methods described in JP-A-7-109122 and JP-A-6-340426.

Although the ferromagnetic metal particles are not particularly limited in the ferromagnetic metal elements thereof, preferably, they comprise Fe, Ni, or Co as their main component (at least 75%). An especially preferred element is Co, because it serves to enhance us and can form a dense and thin oxide film. The content of Co atoms is preferably from 5 to 40%, more preferably from 10 to 30%, based on the amount of Fe atoms. It is preferred that part of the necessary amount of Co be incorporated into a starting material by doping and the remainder be adhered to the surface of the doped starting material, before the Co is converted to an alloy through reduction.

The ferromagnetic metal particles for use in the present invention preferably contain up to 20 wt % atoms of elements besides atoms of the given metals. Examples of the optional elements include Al, Si, S, Ti, V, Cr, Cu, Y, Mo, Rh, Pd, Ag, Sn, Sb, Te, Ba, Sr, W, Au, Pb, Bi, La, Ce, Pr, Nd, P, Mn, Zn, Sr, B, and Ca. These elements not only contribute to regulation of the shape of the starting material, but also are effective in preventing sintering, accelerating reduction, and regulating the shape and surface roughness of the ferromagnetic metal particles produced through reduction.

The final reduction for completely reducing monodisperse goethite or monodisperse hematite into the metal is conducted with pure hydrogen. It is useful to conduct annealing in the course of the reduction at the stage of $\alpha$-$Fe_2O_3$. For the reduction of $\alpha$-$Fe_2O_3$ to $Fe_3O_4$ and FeO, various reducing gases may be used in stead of pure hydrogen. Since the presence of water during reduction influences the occurrence of sintering, it is necessary that the water resulting from reduction should be rapidly removed from the system after the formation of metal nuclei from a metal oxide or during the subsequent formation of crystallites, or that the reduction should be regulated so as to yield a reduced amount of water. This regulation of water amount can be accomplished by controlling the partial pressure or amount of a reducing gas.

The ferromagnetic metal particles of the present invention can be obtained by heating metal oxide particles in an inert gas as described above to form metal nuclei distributed in the particles and then conducting reduction with hydrogen as described just above.

An oxide film is formed on the surface of the ferromagnetic metal particles by a gradual oxidation treatment in order to impart chemical stability thereto. The ferromagnetic metal particles may contain a small amount of a hydroxide or oxide. If the gas used for the gradual oxidation contains carbon dioxide, carbon dioxide is adsorbed onto basic sites present on the surface of the ferromagnetic metal particles. The ferromagnetic metal particles which have undergone the gradual oxidation may contain such adsorbed carbon dioxide.

The ferromagnetic metal particles for use in the present invention are regulated so as to have an average major axis length of 0.05 to 0.12 µm, preferably 0.05 to 0.10 µm, and an aspect ratio of 4.0 to 10.0, preferably 4.0 to 8.0, and to be composed of crystallites, the average number of crystallites per particle being from 2.0 to 5.0, preferably from 2.5 to 5.0, the aspect ratio of the crystallites being from 1.0 to 2.0, preferably from 1.3 to 2.0.

In the present invention, the term "ferromagnetic metal particles" means particles defined by the largest particle contours attributable to the size and shape of the starting material used. The largest contours of the individual particles are used to determine the average major axis length and average aspect ratio of the ferromagnetic metal particles. The crystallites mean the individual metal crystals of which the ferromagnetic metal particles are composed. Each ferromagnetic metal particle, which is defined by the metal particle contour, need not consist of one crystal, and often comprises two or more crystals. In a photograph taken with a high-resolution transmission electron microscope, the particle defined by a largest particle contour is a ferromagnetic metal particle. Upon closer examination of the photograph, lattice images are obtained. The units which give the lattice images are crystallites.

Figure 1:
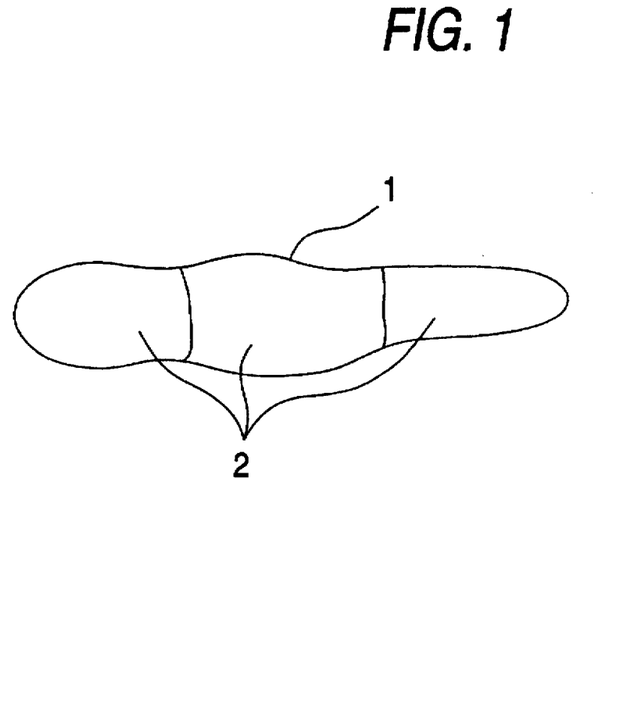
FIG. 1 is a view illustrating a ferromagnetic metal particle for use in the present invention.
Figure 2:
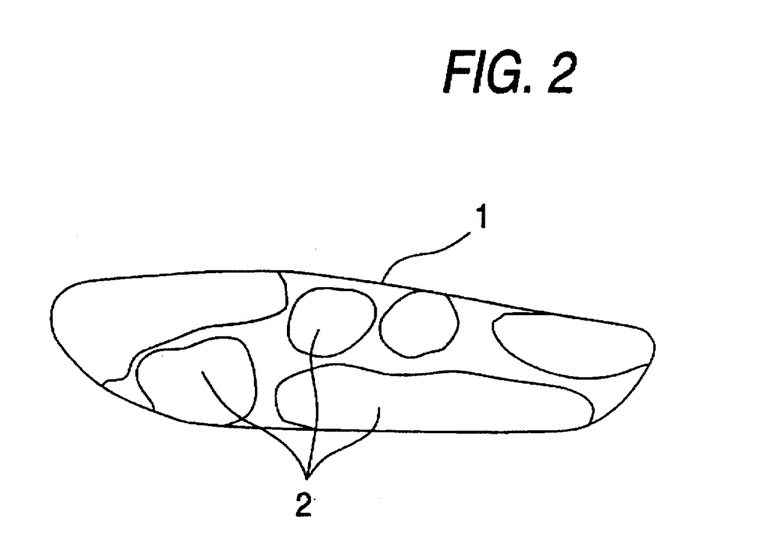
FIG. 2 is a view illustrating a conventional ferromagnetic metal particle.

In the conventional processes for producing magnetic metal particles from goethite ($\alpha$-FeOOH) or hematite ($\alpha$-$Fe_2O_3$) as a starting material, the particle contours attributable to the size and shape of the starting material are large. Specifically, the conventional ferromagnetic metal particles have an average major axis length of about 0.2 to 0.3 µm. In those conventional processes, the particle contours contract simultaneously with reduction into the metal with elimination of oxygen to give polycrystalline sparse metal particles as shown in FIG. 2. In addition, the crystallites of each metal particle are not uniform in size and shape, and the number of crystallites per particle is from 4 to 10, or more than 10. In contrast, in the present invention, the size of the particle contours attributable to the size and shape of a starting material is reduced (average major axis length, from 0.04 to 0.10 µm) and the average number of crystallites per particle is regulated to from 2.0 to 5.0 as shown in FIG. 1, unlike the conventional polycrystalline state, to thereby render the crystal structure as dense as possible. For defining the above-described structure characteristic of the ferromagnetic metal particles for use in the present invention, the average major axis length and average aspect ratio of the ferromagnetic metal particles are limited to from 0.05 to 0.12 µm and from 4.0 to 10.0, respectively, and the average number of crystallites and average aspect ratio of the crystallites are limited to from 2.0 to 5.0 and from 1.0 to 2.0, respectively. In particular, the ferromagnetic metal particles for use in the present invention are distinctly different from conventional magnetic metal particles in that the average major axis length thereof is as short as from 0.05 to 0.12 µm, unlike the conventional magnetic metal particles, and that the crystallites thereof have uniformity in size and shape, with the average aspect ratio of the crystallites being from 1.0 to 2.0. By thus regulating these properties, acicular ferromagnetic metal particles each composed of densely bonded crystallites are obtained, as desired in the present invention.

If ferromagnetic metal particles having a major axis length smaller than 0.05 µm are used, the desired coercive force is not obtained, and the particles show poor dispersibility in the preparation of a coating fluid and are less suitable for magnetic orientation. In addition, due to the influence of the oxide film formed for stabilization, it is difficult to ensure the high saturation magnetization necessary for high-density recording. Use of ferromagnetic metal particles which have a major axis length larger than 0.12 µm and in which the average number of crystallites is from 2.0 to 5.0 and the average aspect ratio of crystallites is from 1.0 to 2.0 is undesirable in that poor overwriting characteristics result because of a considerably impaired Hc distribution (in particular, an increased proportion of components having an Hc of 3,000 Oe or more), and that the magnetic recording medium obtained using such ferromagnetic metal particles has increased surface roughness. Ferromagnetic metal particles in which the aspect ratio of crystallites is outside the range of 1.0 to 2.0, even though the number of crystallites is 2.0 to 5.0, are undesirable in that they contain an increased proportion of high-coercive-force components and, hence, the magnetic recording medium obtained using such ferromagnetic metal particles has impaired overwriting characteristics.

The crystallites preferably have such an aspect ratio distribution that at least 80%, preferably 100%, of the crystallites have an aspect ratio of 1.0 to 2.0, because such crystallites bring about a narrow Hc distribution. In view of accuracy of analysis, from 85 to 95% of the crystallites preferably have an aspect ratio of 1.0 to 2.0. Ferromagnetic metal particles in which the proportion of crystallites having a high aspect ratio is large tend to contain a large proportion of high-coercive-force components.

The magnetic layer in the present invention has a coercive force Hc of 2,000 to 3,000 Oe, preferably 2,100 to 2,800 Oe, and more preferably 2,200 to 2,500 Oe, and a Bm (maximum flux density) of 3,800 to 5,500 gauss (G), preferably 4,800 to 5,500 G. If Hc or Bm is lower than the lower limit, a sufficient short-wavelength output cannot be obtained. If Hc or Bm is higher than the upper limit, a recording head is saturated, so that a sufficient output cannot be ensured.

The saturation magnetization of the fine ferromagnetic metal particles for use in the present invention is 125 emu/g or more, preferably from 130 to 165 emu/g, and more preferably from 135 to 150 emu/g. A method effective in obtaining ferromagnetic metal particles having a heightened saturation magnetization is to conduct a treatment with either the compound described in JP-A-61-52327 or a coupling agent having any of various substituents immediately after reduction and then conduct gradual oxidation. The coercive force of the ferromagnetic metal particles is usually from 1,700 to 3,000 Oe (oersteds), preferably from 1,800 to 3,000 Oe, and more preferably from 1,900 to 2,500 Oe. The present inventor presumes that by regulating the number of crystallites constituting each ferromagnetic metal particle to from 2.0 to 5.0 and the average aspect ratio of the crystallites to from 1.0 to 2.0, the resulting ferromagnetic metal particles can show reversal of magnetization the mode of which is close to the ideal fanning mode, and can be fine particles with a high coercive force as in the present invention.

In the present invention, a photograph of ferromagnetic metal particles was taken with a high-resolution transmission electron microscope to determine the average major axis length of the ferromagnetic metal particles and determine the number of crystallites from the lattice images in ferromagnetic metal particles. Found values for about 200 particles were averaged. In determining the aspect ratio of crystallites, the contour of each crystallite on the high-resolution electron photomicrograph was traced with an image analyzer to determine the average length and width of the crystallites, and the aspect ratio thereof (length/width) was then calculated.

Furthermore, the fine ferromagnetic metal particles may be treated with, for example, a dispersant, a lubricant, a surfactant, or an antistatic agent described below, before the dispersion. These treatments are described in, for example, JP-B-44-14090, JP-B-45-18372, JP-B-47-22062, JP-B-47-22513, JP-B-46-28466, JP-B-46-38755, JP-B-47-4286, JP-B-47-12422, JP-B-47-17284, JP-B-47-18509, JP-B-47-18573, JP-B-39-10307, JP-B-48-39639, and U.S. Pat. Nos. 3,026,215, 3,031,341, 3,100,194, 3,242,005, and 3,389,014.

The water content of the ferromagnetic metal particles is preferably from 0.01 to 2% by weight, and is preferably optimized according to the kind of the binder, which will be described later.

The tap density of the ferromagnetic metal particles is preferably from 0.2 to 0.8 g/ml. Ferromagnetic metal particles having a tap density higher than 0.8 g/ml are undesirable in that since such particles are not evenly oxidized in gradual oxidation, not only they are difficult to handle safely, but also the tape obtained using the same undergoes a decrease in magnetization with the lapse of time. Ferromagnetic metal particles having a tap density lower than 0.2 g/ml tend to be poorly dispersed.

The binder resin for use in the magnetic layer in the magnetic medium of the present invention may be a conventionally known thermoplastic resin, thermosetting resin, or reactive resin, or a mixture thereof.

The thermoplastic resin may be one having a glass transition temperature of $-100°$ to $150°$ C., a number-average molecular weight of 1,000 to 200,000, preferably 10,000 to 100,000, and a degree of polymerization of about 50 to 1,000.

Examples of the thermoplastic resin include polymers or copolymers containing a structural unit derived from vinyl chloride, vinyl acetate, vinyl alcohol, maleic acid, acrylic acid, acrylate, vinylidene chloride, acrylonitrile, methacrylic acid, methacrylate, styrene, butadiene, ethylene, vinyl butyral, vinyl acetal, or vinyl ether; polyurethane resins; and various rubber-type resins.

Examples of the thermosetting or reactive resin include phenolic resins, epoxy resins, thermosetting polyurethane resins, urea resins, melamine resins, alkyd resins, reactive acrylic resins, formaldehyde resins, silicone resins, epoxy-polyamide resins, mixtures of polyester resin and isocyanate prepolymer, mixtures of polyester polyol and polyisocyanate, and mixtures of polyurethane and polyisocyanate.

For obtaining further improved dispersibility of the ferromagnetic particles and durability of the magnetic layer, it is preferred to use, according to need, one or more of the above-enumerated binders which have incorporated therein through copolymerization or addition reaction, at least one polar group selected from —COOM, —SO$_3$M, —OSO$_3$M, —P=O(OM)$_2$, —O—P=O(OM)$_2$ (wherein M represents a hydrogen atom or an alkali metal salt group), —OH, —NR$_2$, —N+R$_3$ (R represents a hydrocarbon group), an epoxy group, —SH, and —CN. The amount of the polar group(s) is from $10^{-1}$ to $10^{-8}$ mol/g, preferably from $10^{-2}$ to $10^{-6}$ mol/g.

The amount of the binder resin for use in the magnetic recording medium of the present invention is from 5 to 50% by weight, preferably from 10 to 30% by weight, based on the amount of the ferromagnetic metal particles. When the vinyl chloride resin, the polyurethane resin, and the polyurethane resin are preferably used in combination in an amount of 5 to 100% by weight, 2 to 50% by weight, and 2 to 100% by weight.

The filling degree of the ferromagnetic metal particles are calculated by the maximum saturation magnetization degree σs and Bm of the ferromagnetic metal particles used (Bm/4πσs). In the present invention, the amount thereof is preferably 1.7 g/ml or more, more preferably 1.9 g/ml or more, and most preferably 2.1 g/ml or more.

In using polyurethane in the present invention, the polyurethane preferably has a glass transition temperature of $-50°$ to $100°$ C., an elongation at break of 100 to 2,000%, a stress at break of 0.05 to 10 kg/cm$^2$, and a yield point of 0.05 to 10 kg/cm$^2$.

Examples of the polyisocyanate for use in the present invention include isocyanates such as tolylene diisocyanate, 4,4'-diphenylmethane diisocyanate, hexamethylene diisocyanate, xylylene diisocyanate, naphthylene 1,5-diisocyanate, o-toluidine diisocyanate, isophorone diisocyanate, and triphenylmethane triisocyanate, products of the reactions of these isocyanates with polyalcohols, and polyisocyanates formed through condensation of isocyanates. These isocyanates are commercially available under the trade names of: Coronate L, Coronate HL, Coronate 2030, Coronate 2031, Millionate MR, and Millionate MTL manufactured by Nippon Polyurethane Co., Ltd.; Takenate D-102, Takenate D-110N, Takenate D-200, and Takenate D-202 manufactured by Takeda Chemical Industries, Ltd.; and Desmodule L, Desmodule IL, Desmodule N, and Desmodule HL manufactured by Sumitomo Bayer Co., Ltd. For each of the layers, these polyisocyanates may be used alone, or used in combination of two or more thereof, taking advantage of a difference in curing reactivity.

The magnetic layer of the present invention may contain additives which have various functions, such as lubricants, grinders, dispersants, antistatic agents, plasticizers, and antimolds, if needed.

Examples of lubricants for use in the magnetic layer of the present invention include silicone oils such as dialkylpolysiloxanes (each alkyl has from 1 to 5 carbon atoms), dialkoxypolysiloxanes (each alkoxy has from 1 to 4 carbon atoms), monoalkylmonoalkoxypolysiloxanes (the alkyl and the alkoxy have from 1 to 5 and from 1 to 4 carbon atoms, respectively), phenylpolysiloxane, and fluoroalkylpolysiloxanes (the alkyl has from 1 to 5 carbon atoms); electrically conductive fine particles, e.g., graphite particles; particles of inorganic substances, e.g., molybdenum disulfide and tungsten disulfide; fine particles of plastics, e.g., polyethylene, polypropylene, polyethylene-vinyl chloride copolymers, and polytetrafluoroethylene; α-olefin polymers; saturated fatty acids which are solid at ordinary temperature (having from 10 to 22 carbon atoms); unsaturated aliphatic hydrocarbons which are liquid at ordinary temperature (compounds having an n-olefin double bond bonded to a terminal carbon atom, and having about 20 carbon atoms); fatty acid esters formed from monobasic fatty acids having from 12 to 20 carbon atoms and monohydric alcohols having from 3 to 12 carbon atoms; and fluorocarbons.

Of the above-enumerated lubricants, the saturated fatty acids and the fatty acid esters are preferred, with a combination of both being preferred. Examples of alcohols usable as starting materials for the fatty acid esters include monohydric alcohols such as ethanol, butanol, phenol, benzyl alcohol, 2-methylbutyl alcohol, 2-hexyldecyl alcohol, propylene glycol monobutyl ether, ethylene glycol monobutyl ether, dipropylene glycol monobutyl ether, diethylene glycol monobutyl ether, and s-butyl alcohol; and polyhydric alcohols such as ethylene glycol, diethylene glycol, neopentyl glycol, glycerol, and sorbitan derivatives. Examples of fatty acids usable as starting materials for the fatty acid esters include aliphatic carboxylic acids such as acetic acid, propionic acid, octanoic acid, 2-ethylhexanoic acid, lauric acid, myristic acid, stearic acid, palmitic acid, behenic acid, arachic acid, oleic acid, linoleic acid, linolenic acid, elaidic acid, and palmitoleic acid, and mixtures of these acids.

Specific examples of the fatty acid esters include butyl stearate, s-butyl stearate, isopropyl stearate, butyl oleate, amyl stearate, 3-methylbutyl stearate, 2-ethylhexyl stearate, 2-hexyldecyl stearate, butyl palmitate, 2-ethylhexyl myristate, butyl stearate/butyl palmitate mixtures, butoxyethyl stearate, 2-butoxy-1-propyl stearate, dipropylene glycol monobutyl ether stearate, diethylene glycol dipalmitate, hexamethylenediol dimyristate, and glycerol oleate.

In order to diminish the hydrolysis of a fatty acid ester which often occurs during use of the magnetic recording medium in a high-humidity atmosphere, a technique is used in which branched/linear isomers, cis/trans isomers, other isomers, and branching sites are taken in account when selecting a fatty acid and an alcohol used as starting materials for the ester.

These lubricants may be added in an amount of 0.2 to 20 parts by weight per 100 parts by weight of the binder.

Other usable lubricants include silicone oils, graphite, molybdenum disulfide, boron nitride, graphite fluoride, fluorinated alcohols, polyolefins, polyglycols, alkyl phosphates, and tungsten disulfide.

Examples of abrasives for use in the magnetic layer of the present invention include generally employed abrasive materials such as α-alumina, γ-alumina, fused alumina, corundum, artificial corundum, silicon carbide, chromium oxide ($Cr_2O_3$), diamond, artificial diamond, garnet, emery (main components; corundum and magnetite), and α-$Fe_2O_3$. These abrasive materials have a Mohs' hardness of 6 or more. Specific examples thereof include AKP-10, AKP-12, AKP-15, 20AKP-30, AKP-50, AKP-1520, AKP-1500, HIT-50, HIT60A, HIT70, HIT80, and HIT-100 manufactured by Sumitomo Chemical Co., Ltd.; G5, G7, S-1, and Chromium Oxide K manufactured by Nippon Chemical Industrial Co., Ltd.; UB40B manufactured by C. Uyemura & Co., Ltd.; WA8000 and WA10000 manufactured by Fujimi Kenmazai Kogyo Co., Ltd.; and TF100, TF140, and TF180 manufactured by Toda Kogyo Co., Ltd. Effective are abrasives having an average particle diameter of 0.05 to 3 μm, preferably from 0.05 to 1.0 μm.

The total addition amount of these abrasives is from 1 to 20 parts by weight, preferably from 1 to 15 parts by weight, per 100 parts by weight of the magnetic material. If the amount of abrasives is smaller than 1 part by weight, sufficient durability cannot be obtained. If the amount thereof is larger than 20 parts by weight, surface properties and loading are impaired. These abrasives may be dispersed into a binder, before being added to a magnetic coating fluid.

Electrically conductive particles may be incorporated as an antistatic agent, besides the nonmagnetic particles described above, into the magnetic layer of the magnetic recording medium of the present invention. However, from the standpoint of forming an uppermost layer having a saturation flux density heightened to the highest level, it is preferred to incorporate most of the conductive particles into a layer other than the uppermost layer to minimize the amount thereof incorporated in the uppermost layer. Carbon black is especially preferably incorporated as an antistatic agent from the standpoint of reducing the surface electrical resistance of the whole medium. Examples of the carbon black for use in the present invention include furnace black for rubbers, thermal black for rubbers, coloring black, conductive carbon blacks, and acetylene black. The carbon black preferably has a specific surface area of 5 to 500 $m^2/g$, a DBP absorption of 10 to 1,500 ml/100 g, a particle diameter of 5 to 300 mμ, a pH of 2 to 10, a water content of 0.1 to 10%, and a tap density of 0.1 to 1 g/ml. Specific examples of the carbon black include BLACKPEARLS 2000, 1300, 1000, 900, 800, 700, and VULCAN XC-72 manufactured by Cabot Co., Ltd.; #80, #60, #55, #50, and #35 manufactured by Asahi Carbon Co., Ltd.; #3950B, #3250B, #2700, #2650, #2600, #2400B, #2300, #900, #1000, #95, #30, #40, #10B, MA230, MA220, and MA77 manufactured by Mitsubishi Chemical Corp.; CONDUCTEX SC, RAVEN 150, 50, 40, and 15 manufactured by Columbian Carbon Co.; and Ketjen Black EC, Ketjen Black ECDJ500, and Ketjen Black ECDJ-600 manufactured by Lion Akzo Co., Ltd. These carbon blacks may be surface-treated with a dispersant or other agent, oxidized, or grafted with a resin before use. The carbon black whose surface has been partly graphitized may also be used. Furthermore, before being added to a magnetic coating fluid, the carbon black may be dispersed into a binder. In using the carbon black in the magnetic layer, the amount thereof is preferably from 0.1 to 30% by weight based on the amount of the magnetic material. In forming a nonmagnetic layer, the carbon black is preferably incorporated therein in an amount of 3 to 20% by weight based on the amount of the inorganic nonmagnetic particles.

In general, the carbon black functions as an antistatic agent, and further serves to reduce the coefficient of friction, as a light screen, and to improve film strength. These effects are produced to different degrees depending on the kind of carbon black used. Therefore, it is, of course, possible in the present invention to change the kind, amount, and combination of carbon blacks according to purposes on the basis of the above-described properties including particle size, oil absorption, electrical conductivity, and pH. With respect to carbon blacks usable in the present invention, reference may be made to, for example, *Carbon Black Binran* (*Carbon Black Handbook*), edited by Carbon Black Association.

In forming a nonmagnetic layer between the magnetic layer and the nonmagnetic support in the magnetic recording medium of the present invention, the nonmagnetic layer (hereinafter often referred to also as a "lower layer") is a layer consisting mainly of inorganic nonmagnetic particles dispersed in a binder resin. Various materials can be used as the inorganic nonmagnetic particles for the nonmagnetic layer. Examples thereof include α-alumina having an α-alumina structure content of 90% or more, β-alumina, δ-alumina, silicon carbide, chromium oxide, cerium oxide, α-iron oxide, corundum, silicon nitride, titanium carbide, titanium oxide, silicon dioxide, boron nitride, zinc oxide, calcium carbonate, calcium sulfate, and barium sulfate. These may be used alone or in combination. These particulate inorganic nonmagnetic materials preferably have a particle size of 0.01 to 2 μm. If needed, particulate inorganic nonmagnetic materials having different particle sizes may be used in combination, or a single particulate inorganic nonmagnetic material having a widened particle diameter distribution may be used so as to produce the same effect. The inorganic nonmagnetic particles to be used may have been surface-treated so as to enhance interaction with the binder resin used to thereby improve dispersibility. The surface treatment may be performed with either an inorganic substance, e.g., silica, alumina, or silica-alumina, or a coupling agent. The inorganic nonmagnetic particles preferably have a tap density of 0.3 to 2 g/ml, a water content of 0.1 to 5% by weight, a pH of 2 to 11, and a specific surface area of 5 to 100 $m^2/g$. The inorganic nonmagnetic particles may have any particle shape selected from the acicular, spherical, cubical, and platy forms. Specific examples of the inorganic nonmagnetic particles for use in the present invention include AKP-20, AKP-30, AKP-50, and HIT-50 manufactured by Sumitomo Chemical Co., Ltd.; G5, G7, and S-1 manufactured by Nippon Chemical Industrial Co., Ltd.; TF-100, TF-120, and TF-140 manufactured by Toda Kogyo Co., Ltd.; TT055 Series and ET300W manufactured by Ishihara Sangyo Kaisha, Ltd.; STT30 manufactured by Titan Kogyo CO., LTD.; and acicular hematite particles used as an intermediate for a magnetic iron oxide or an intermediate for producing ferromagnetic metal particles by the iron oxide reduction method.

The layer constitution of the magnetic recording medium of the present invention is not particularly limited, as long as the medium basically comprises at least a nonmagnetic support and the above-described magnetic layer formed thereover or further has the nonmagnetic layer described above. A magnetic or nonmagnetic layer having another composition may be formed. For example, in the case of forming a ferromagnetic layer in place of the above-described nonmagnetic layer, various ferromagnetic materials can be used therefor, such as, e.g., a ferromagnetic iron oxide, a cobalt-modified ferromagnetic iron oxide, $CrO_2$, a hexagonal ferrite, and other ferromagnetic metals. These ferromagnetic materials are dispersed in a resin to form the ferromagnetic layer. This ferromagnetic layer is also referred to as a lower layer.

Forming two or more coating layers on a nonmagnetic support is effective in producing a magnetic recording medium for high-density recording. A simultaneous coating technique is especially superior in that it can form an ultrathin magnetic layer. Specific examples of wet-on-wet coating as the simultaneous coating techniques include the following methods.

1. A lower layer is first applied with a coating apparatus commonly used for magnetic coating fluid application, e.g., a gravure coating, roll coating, blade coating, or extrusion coating apparatus, and an upper layer is then applied, while the lower layer is in a wet state, by means of a support-pressing extrusion coater such as those disclosed in JP-B-146186, JP-A-60-238179, and JP-A-2-265672.

2. An upper layer and a lower layer are applied almost simultaneously using a single coating head having therein two slits for passing coating fluids, such as those disclosed in JP-A-63-88080, JP-A-2-17971, and JP-A-2-265672.

3. An upper layer and a lower layer are applied almost simultaneously with an extrusion coater equipped with a back-up roll, such as that disclosed in JP-A-2-174965.

In wet-on-wet coating, it is preferred that the flow characteristics of the coating fluid for magnetic-layer formation be akin as much as possible to those of the coating fluid for nonmagnetic-layer formation, because the interface between the magnetic and nonmagnetic coating layers formed therefrom has no disturbance and, as a result, the magnetic layer obtained can have uniformity in thickness with diminished thickness fluctuations. Since the flow characteristics of a coating fluid largely depend on the combination of the particles and the binder resin contained in the coating fluid, special care should be taken in selecting nonmagnetic particles for use in the nonmagnetic layer.

The nonmagnetic support used in the magnetic recording medium of the present invention has a thickness of 1 to 100 μm, and preferably 3 to 20 μm. The nonmagnetic layer has a thickness of 0.5 to 10 μm, and preferably 1 to 4 μm. When a magnetic layer is formed on a nonmagnetic layer, the thickness of the magnetic layer is 0.05 to 3.0 μm, and preferably 0.05 to 2.0 μm. In forming a magnetic layer without forming a nonmagnetic layer, the thickness of the magnetic layer is 0.05 to 5.0 μm, and preferably 1.5 to 2.5 μm.

Layers other than the magnetic and nonmagnetic layers described above can be formed according to purposes. For example, an undercoat layer may be formed between the nonmagnetic support and the lower layer in order to improve adhesion. This undercoat layer has a thickness of 0.01 to 2 μm, and preferably 0.05 to 0.5 μm. A back coat layer may be formed on the nonmagnetic support on the side opposite to the magnetic layer. This back coat layer has a thickness of 0.1 to 2 μm, and preferably 0.3 to 1.0 μm. These undercoat and back coat layers may be known layers. In a disk-form magnetic recording medium, the above-described layers may be formed on one or both sides.

The nonmagnetic support for use in the present invention is not particularly limited, and ordinarily employed nonmagnetic supports may be used in the present invention. Examples of materials used for constituting nonmagnetic supports include films of various synthetic resins such as poly(ethylene terephthalate), polyethylene, polypropylene, polycarbonates, poly(ethylene naphthalate), polyamides, poly(amide-imide)s, polyimides, polysulfones, and polyethersulfones and metal foils such as aluminum foil and stainless-steel foil.

In order to attain the objects of the present invention, it is preferred to use a nonmagnetic support having a center line average surface roughness (Ra: cutoff value: 0.25 mm) of 0.03 μm or less, preferably 0.02 μm or less, and more preferably 0.01 μm or less. In addition that the nonmagnetic recording medium of the present invention has a small center line average surface roughness, the nonmagnetic support is preferably free from projections as large as 1 μm or more. The state of the surface roughness of the support can be freely controlled by changing the size and amount of a filler which is incorporated into the support if needed. Examples of the filler include oxides or carbonates of Ca, Si, and Ti and fine organic powders such as acrylic powder. The nonmagnetic support for use in the present invention preferably has an F-5 value in the web running direction of 5 to 50 kg/mm$^2$ and an F-5 value in the web width direction of 3 to 30 kg/mm$^2$. Although the F-5 value in the web longitudinal direction is generally higher than that in the web width direction, this does not apply in the case where the width direction strength, in particular, should be enhanced.

The degrees of thermal shrinkage of the support in the web running direction and in the web width direction are preferably 3% or less, more preferably 1.5% or less, under conditions at 100° C. for 30 minutes, and are preferably 1% or less, more preferably 0.5% or less, under conditions at 80° C. for 30 minutes. The strength at break thereof is preferably from 5 to 100 kg/mm$^2$, and the modulus thereof is preferably from 100 to 2,000 kg/mm$^2$.

Examples of organic solvents for use in the present invention include ketones such as acetone, methyl ethyl ketone, methyl isobutyl ketone, diisobutyl ketone, cyclohexanone, isophorone, and tetrahydrofuran; alcohols such as methanol, ethanol, propanol, butanol, isobutyl alcohol, isopropyl alcohol, and methylcyclohexanol; esters such as methyl acetate, butyl acetate, isobutyl acetate, isopropyl acetate, ethyl lactate, and glycol acetate; glycol ethers such as glycol dimethyl ethers, glycol monoethyl ethers, and dioxane; aromatic hydrocarbons such as benzene, toluene, xylene, cresol, and chlorobenzene; chlorinated hydrocarbons such as methylene chloride, ethylene chloride, carbon tetrachloride, chloroform, ethylene chlorohydrin, and dichlorobenzene; and other compounds such as N,N-dimethylformamide and hexane. These solvents may be used in arbitrary proportions. These organic solvents need not be 100% pure, and may contain impurities, such as isomers, unreacted raw materials, by-products, decomposition products, oxidation products, and water, besides the main components. The content of these impurities is preferably 30% or less, more preferably 10% or less. In the present invention, the organic solvents used in the magnetic layer and the nonmagnetic layer may be different in kind and amount, if needed. For example, it is possible to use a highly volatile solvent to form a nonmagnetic layer having improved surface properties, to use a solvent with a high surface tension (e.g., cyclohexane or dioxane) to improve the stability of the coating for forming a nonmagnetic layer, or to use a solvent with a high solubility parameter for forming a magnetic layer to increase loading. However, methods of using organic solvents are, of course, not limited to these examples.

The magnetic recording medium of the present invention is obtained by a process comprising kneading the above-described ferromagnetic metal particles and binder resin together with an organic solvent if necessary further with other optional additives, applying the resulting magnetic coating fluid on a nonmagnetic support, and drying the coating. Prior to the drying step, orientation may be conducted if needed.

The process for preparing a magnetic coating fluid to be used for producing the magnetic recording medium of the present invention comprises at least a kneading step and a dispersing step, and may further comprise a mixing step that may be conducted, if necessary, before and after the two steps. Each step may include two or more stages. Each of the materials for use in the present invention, including the ferromagnetic metal particles, binder, carbon black, abrasive material, antistatic agent, lubricant, and solvent, may be added in any step either at the beginning of or during the step. Furthermore, each ingredient may be added portionwise in two or more steps. For example, a polyurethane may be added portion-wise in each of the kneading step, the dispersing step, and the mixing step for viscosity adjustment after the dispersion.

For kneading and dispersion for preparing a magnetic coating fluid, any of various kneading machines may be used. Examples thereof include a two-roll mill, three-roll mill, ball mill, pebble mill, tron mill, sand grinder, Szegvari, attritor, high-speed impeller dispersing machine, high-speed stone mill, high-speed impact mill, disper, kneader, high-speed mixer, homogenizer, and ultrasonic dispersing machine.

Conventionally known manufacturing techniques can, of course, be used as part of the process to attain the object of the present invention. It is, however, preferred to use a kneading machine having high kneading power, such as a continuous kneader or pressure kneader, in the kneading step. In the case of using a continuous kneader or pressure kneader, the ferromagnetic metal particles are kneaded together with all or part (preferably at least 30%) of the binder, the binder amount being in the range of 15 to 500 parts by weight per 100 parts by weight of the ferromagnetic metal particles. Details of this kneading treatment are given in JP-A-1-106338 and JP-A-64-79274. The magnetic recording medium of the present invention can be efficiently produced by employing a technique of simultaneous multiple coating such as that shown in JP-A-62-212933.

The residual solvent content in the magnetic layer in the magnetic recording medium of the present invention is preferably 100 mg/m$^2$ or less, more preferably 10 mg/m$^2$ or less. It is preferred that the residual solvent content in the magnetic layer be lower than that in the nonmagnetic layer.

The void content in the lower layer and that in the upper layer are each preferably 30% by volume or less, and more preferably 10% by volume or less. The nonmagnetic layer preferably has a higher void content than the magnetic layer, but may have a lower void content as long as its void content is 5% by volume or more.

The magnetic recording medium of the present invention, which may have a lower layer and an upper layer, can be made to have a difference in physical property between the upper and lower layers according to purposes, as can be easily presumed. For example, the upper layer is made to have a heightened modulus to improve running durability and, at the same time, the lower layer is made to have a lower modulus than the magnetic layer to improve the head touching of the magnetic recording medium.

The magnetic coating layer thus formed on a support is subjected, if necessary, to an orientation treatment for orienting the ferromagnetic metal particles contained in the layer, and then dried. A surface-smoothing treatment may be performed if needed, and the resulting structure is cut into a desired shape. Thus, the magnetic recording medium of the present invention is produced. The above-described composition for upper-layer formation and the optional composition for lower-layer formation each is dispersed along with a solvent. The coating fluids thus obtained are applied to a nonmagnetic support, and orientation and drying are conducted to obtain a magnetic recording medium.

The magnetic layer preferably has a modulus at 0.5% elongation of 100 to 2,000 kg/mm$^2$ in each of the machine and transverse directions and a strength at break of 1 to 30 kg/cm$^2$. The magnetic recording medium preferably has a modulus of 100 to 1,500 kg/mm$^2$ in each of the machine and transverse directions and a residual elongation of 0.5% or less. The degree of thermal shrinkage of the magnetic recording medium at any temperature not higher than 100° C. is preferably 1% or less, more preferably 0.5% or less, and most preferably 0.1% or less.

The magnetic recording medium of the present invention may be a tape for video, audio, or another use, or may be a floppy disk or magnetic disk for data recording. The recording medium of this invention is particularly effective when used as a digital recording medium in which the occurrence of signal dropouts should be avoided by all means. By employing a constitution in which the lower layer is a nonmagnetic layer and the uppermost layer has a thickness of 1 μm or less, a large-capacity magnetic recording medium can be obtained which has high electromagnetic characteristics and excellent overwriting characteristics and is suitable for high-density recording.

The present invention will be explained in detail by reference to the following Examples and Comparative Examples, but the invention should not be construed as being limited thereto. All percents, parts, ratios and the like are by weight unless otherwise indicated.

PRODUCTION EXAMPLES 1-1 TO 1-5

Production of Ferromagnetic Metal Powders

To a mixture of 35 l of 1.7 mol/l sodium carbonate and 15 l of 2.0 mol/l sodium hydroxide placed in a 150-l tank equipped with a stirrer was added 0.4 l of 0.5 mol/l aqueous sodium phosphate solution. While nitrogen was continuously bubbled thereinto, 40 l of an aqueous solution of ferrous sulfate and cobalt sulfate ($Fe^{2+}$ concentration, 1.35 mol/l; Co concentration, 0.15 mol/l) prepared in another tank with nitrogen bubbling was added thereto. After the resulting mixture was stirred for 10 minutes, the temperature of the suspension was adjusted to 20° C. to form a precipitate containing ferrous iron. Air was introduced in place of nitrogen to oxidize the precipitate to thereby yield nuclear goethite crystals. At the time when the $Fe^{2+}$ concentration of the suspension reached 0.5 mol/l, the oxidation with air was stopped. Nitrogen was introduced in place of air, and the suspension was heated to 40° C. and maintained at this temperature for 2 hours, following which 1 l of 1.1 mol/l aqueous sodium aluminate solution was added. Thereafter, air was introduced in place of nitrogen to further conduct an oxidation reaction to thereby yield spindle-shaped goethite particles. The particles obtained were taken out by filtration and washed with water. Part of the particles were dried and photographed with a transmission electron microscope to determine the average particle diameter thereof. As a result, the goethite particles were found to have an average major axis length of 0.14 μm and an average aspect ratio of 10. Furthermore, the specific surface area of the particles was measured after dehydration by 30-minute heating at 120° C. in nitrogen, and was found to be 120 m$^2$/g.

The goethite obtained was dispersed into water to give a 2% slurry. An aqueous solution of cobalt sulfate and/or an aqueous solution of calcium chloride was added to the slurry with stirring so as to result in the Co and/or Ca addition amount (amount of the atoms (%) based on the iron atom amount) shown in Table 1. This slurry was neutralized with aqueous sodium hydroxide solution to deposit a cobalt compound and/or a calcium compound on the surface of the particles. The slurry was filtered, and the particles taken out were dispersed into water to give a 2% slurry again. Aqueous aluminum sulfate solution was added thereto (the Al atom amount (%) based on the iron atom amount is shown in Table 1). At 20 minutes after the addition of aluminum sulfate, aqueous sodium hydroxide solution was added to neutralize the slurry. The particles were taken out by filtration, washed with water, and dispersed into water to give a 2% slurry. Aqueous yttrium nitrate solution was added (the Y atom amount (%) based on the iron atom amount is shown in Table 1), and the pH of the slurry was adjusted to 8.5 with aqueous sodium hydroxide solution. The particles were taken out by filtration, washed with water, and dispersed into water to give a 5% slurry, which was then heated at 130° C. for 30 minutes. Thereafter, the particles were taken out by filtration and washed with water. The resulting cake was compacted with a compactor and then dried to obtain spindle-shaped goethite particles which had undergone a sintering prevention treatment. The spindle-shaped goethite obtained was dried at 450° C. for 1 hour in nitrogen by means of a rotary type electric furnace to yield hematite. This hematite was dispersed into water with a sand grinder, and the dispersed hematite particles were washed with water to remove alkali metal ions which had become soluble. The cake obtained was compacted with a compactor and then dried. Thus, raw materials to be reduced were obtained.

Each hematite material compacted was placed in a stationary reducing furnace, and heated at 600° C. for 2 hours in nitrogen to enhance the crystallinity of the hematite. The temperature was lowered to 450° C., and hydrogen gas was introduced in place of nitrogen to conduct reduction for 30 minutes. Thereafter, nitrogen was introduced in place of hydrogen to conduct heating at 550° C. for 1 hour, and pure hydrogen was then introduced in place of nitrogen to conduct reduction for 5 hours. Nitrogen was introduced in place of pure hydrogen to cool the contents to room temperature, and an air/nitrogen mixture regulated to have an oxygen concentration of 0.5% was introduced to conduct gradual oxidation at 50° C. or lower while monitoring the temperature of the metal powder. After heat generation ended, the oxygen concentration was adjusted to 1% to continue gradual oxidation for 10 hours. Thereafter, a vapor of distilled water was introduced together with air in such an amount as to result in a water amount of 1% based on the amount of the metal powder to humidify and stabilize the powder.

Magnetic characteristics of the thus-obtained ferromagnetic metal powders were determined with a sample-vibrating magnetometer (manufactured by Toei Kogyo CO., LTD.) at an external magnetic field of 10 kOe. Each ferromagnetic metal powder obtained was photographed with a high-resolution transmission electron microscope to determine the average major axis length (μm) and average aspect ratio of the contour particles and the average number per particle and average aspect ratio of the crystallites.

Furthermore, the specific surface area ($S_{BET}$) of each powder was measured with Quantasorb (manufactured by Quantachrome Co., Ltd.) after 30-minute dehydration at 250° C. in nitrogen. The results obtained are shown in Table 1.

PRODUCTION EXAMPLES 2-1 TO 2-6

Using the elements shown in Table 1, hematite materials to be reduced were obtained through the same steps as in Production Example 1. Each hematite material was placed in a stationary reducing furnace, and dehydrated at 350+ C. for 60 minutes in nitrogen. The temperature was lowered to 450° C., and pure hydrogen was introduced in place of nitrogen to conduct reduction for 6 hours. The subsequent treatments were carried out in the same manner as in Production Example 1. The ferromagnetic metal powders thus obtained were evaluated in the same manner as in Production Example 1. The results obtained are shown in Table 1.

using the elements shown in Table 2 in the same manner as in Production Example 1, and then treated with the antisintering agents. This goethite was taken out by filtration, washed with water, compacted with a compactor, dried, and the heated in nitrogen. Thereafter, the material obtained through washing with water, compaction, and drying in the same manner as in Production Example 1 was reduced and subjected to gradual oxidation. The ferromagnetic metal powders thus obtained were evaluated in the same manner as in Production Example 1. The results obtained are shown in Table 2.

TABLE 1

| Production Example | Element Added | | Antisintering Agent | | Hc | σs | $S_{BET}$ | Ferromagnetic Metal Particle | | Crystallite | |
|---|---|---|---|---|---|---|---|---|---|---|---|
| | Mg | Co | Al | Y | (Oe) | (emu/g) | (m²/g) | Major Axis Length | Aspect Ratio | Average Number | Aspect Ratio |
| 1-1 | 0.2 | 0.0 | 7.0 | 5.0 | 1910 | 136.5 | 57.5 | 0.085 | 6.8 | 4.2 | 1.8 |
| 1-2 | 0.2 | 10 | 7.0 | 7.0 | 2100 | 139.0 | 55.3 | 0.080 | 6.5 | 3.8 | 1.7 |
| 1-3 | 0.4 | 15 | 5.0 | 9.0 | 2255 | 142.2 | 53.8 | 0.074 | 6.2 | 3.5 | 1.7 |
| 1-4 | 0.8 | 20 | 5.0 | 9.0 | 2280 | 145.5 | 50.9 | 0.073 | 6.1 | 3.3 | 1.9 |
| 1-5 | 0.0 | 15 | 5.0 | 9.0 | 2130 | 140.4 | 52.4 | 0.076 | 6.2 | 3.0 | 1.9 |
| 2-1 | 0.3 | 0.0 | 8.0 | 6.0 | 1700 | 132.3 | 57.8 | 0.08 | 6.8 | 3.5 | 2.1 |
| 2-2 | 0.3 | 10 | 8.0 | 7.0 | 1870 | 135.5 | 56.3 | 0.076 | 6.1 | 3.2 | 2.1 |
| 2-3 | 0.2 | 0.0 | 7.0 | 5.0 | 1740 | 131.8 | 58.8 | 0.088 | 6.8 | 1.3 | 5.5 |
| 2-4 | 0.2 | 10 | 7.0 | 7.0 | 1820 | 133.7 | 56.5 | 0.082 | 6.4 | 1.4 | 5.3 |
| 2-5 | 0.4 | 15 | 5.0 | 9.0 | 1990 | 136.3 | 54.5 | 0.074 | 6.2 | 1.2 | 5.5 |
| 2-6 | 0.8 | 20 | 5.0 | 9.0 | 1920 | 137.5 | 52.7 | 0.072 | 6.0 | 1.1 | 5.4 |

TABLE 2

| Production Example | Element Added | | Antisintering Agent | | Hc | σs | $S_{BET}$ | Ferromagnetic Metal Particle | | Crystallite | |
|---|---|---|---|---|---|---|---|---|---|---|---|
| | Ca | Co | Al | Y | (Oe) | (emu/g) | (m²/g) | Major Axis Length | Aspect Ratio | Average Number | Aspect Ratio |
| 3-1 | 0.2 | 0.0 | 7.0 | 6.0 | 1830 | 133.2 | 61.75 | 0.16 | 13 | 4.0 | 3.5 |
| 3-2 | 0.4 | 15 | 7.0 | 8.0 | 2100 | 138.5 | 58.2 | 0.14 | 12 | 3.8 | 3.1 |

PRODUCTION EXAMPLES 3-1 AND 3-2

Goethite was produced in the same manner as in Production Example 1, except the following. After nuclear goethite crystals were formed at 25° C. and at the time when the $Fe^{2+}$ concentration of the suspension reached 0.75 mol/l, oxidation with air was stopped and nitrogen was introduced in place of air. Sodium aluminate was added, and the suspension was heated to 50° C. to conduct oxidation with air. The goethite thus yielded had an average major axis length of 0.23 μm, an average aspect ratio of 16, and a specific surface area of 125 m²/g. Subsequently, the goethite was treated

EXAMPLES 1-1 TO 1-5 AND COMPARATIVE EXAMPLES 1-1 TO 1-8

The composition for magnetic-layer formation and the composition for nonmagnetic-layer formation both shown below were prepared in order to produce multilayered magnetic tapes respectively using the ferromagnetic metal powders obtained in Production Examples 1-1 to 1-5, 2-1 to 2-6, and 3-1 and 3-2.

Composition for Magnetic-Layer Formation

| Ferromagnetic metal powder (shown in Table 3) | 100 parts |
|---|---|
| Binder resin | |
| Vinyl chloride copolymer | 12 parts |
| —SO$_3$Na group content: 1 × 10$^{-4}$ eq/g | |
| degree of polymerization: 300 | |
| Polyester polyurethane resin | 5 parts |
| neopentyl glycol/caprolactonepolyol/MDI = | |
| 0.9/2.6/1 (by mol) | |
| —SO$_3$Na group content: 1 × 10$^{-4}$ eq/g | |
| α-Alumina (average particle diameter: 0.13 μm) | 5 parts |
| Carbon black (average particle diameter: 40 nm) | 1 part |
| Butyl stearate | 1 part |
| Stearic acid | 2 parts |
| Methyl ethyl ketone/cyclohexanone (1:1) mixed solvent | 200 parts |

Composition for Nonmagnetic-Layer Formation

| Spherical titanium oxide | 80 parts |
|---|---|
| specific surface area: 70 m$^2$/g | |
| average particle diameter: 0.024 μm | |
| pH: 7.5 | |
| surface treatment: Al$_2$O$_3$/TiO$_2$ 6.5 wt % | |
| Carbon black | 20 parts |
| average primary particle diameter: 17 nm | |
| DBP absorption: 80 ml/100 g | |
| BET specific surface area: 240 m$^2$/g | |
| pH: 5.5 | |
| Binder resin | |
| Vinyl chloride copolymer | 12 parts |
| —SO$_3$Na group content: 1 × 10$^{-4}$ eq/g | |
| degree of polymerization: 300 | |
| Polyester polyurethane resin | 7 parts |
| backbone, 1,4-BD/phthalic acid/HMDI = | |
| 2/2/1 (by mol) | |
| molecular weight: 10,200 | |
| hydroxyl group content: 0.23 × 10$^{-3}$ eq/g | |
| —SO$_3$Na group content: 1 × 10$^{-4}$ eq/g | |
| Butyl stearate | 1 part |
| Stearic acid | 2.5 parts |
| Methyl ethyl ketone/cyclohexanone (1:1) mixed solvent | 200 parts |

With respect to each of the composition for magnetic-layer formation and the composition for nonmagnetic-layer formation, the ingredients were kneaded with a kneader and then dispersed with a sand grinder. To the resulting dispersions was added a polyisocyanate in an amount of 5 parts for the coating fluid for nonmagnetic-layer formation and in an amount of 6 parts for the coating fluid for magnetic-layer formation. To each dispersion was further added 20 parts of a methyl ethyl ketone/cyclohexanone (1:1) mixed solvent. These dispersions were filtered through a filter having an average opening diameter of 1 μm to prepare a coating fluid for nonmagnetic-layer formation and a coating fluid for magnetic-layer formation.

The two coating fluids obtained were applied on a 7 μm-thick poly(ethylene terephthalate) support by wet-on-wet simultaneous double coating as follows. The coating fluid for nonmagnetic-layer formation was applied first at a dry thickness of 1.8 μm, and the coating fluid for magnetic-layer formation was applied immediately thereafter on the still wet nonmagnetic layer coating in such an amount as to give a 0.15 μm-thick magnetic layer. While the two coating layers were still in a wet state, longitudinal orientation was performed by passing the coated support through an orientation apparatus. In this orientation, the coated support was passed by a rare earth magnet (surface flux density, 5,000 G) and then passed through a solenoid magnet (flux density, 5,000 G), and was dried within the solenoid to such a degree that the oriented state was maintained. The magnetic layer was further dried, before the coated support was wound up. Thereafter, calendering was conducted with a 7-roll calender comprising metal rolls at a roll temperature of 90° C. to obtain a magnetic recording medium as a web. The web was slit into an 8-mm width. Thus, 8-mm video tape samples were produced. The samples were examined with a sample-vibrating magnetometer for magnetic characteristics and the content of high-Hc components, and were also examined for surface roughness. The samples were further examined with a drum tester for ½ Tb output, C/N, and overwriting characteristics. The results obtained are shown in Table 3. As a reference for the examination of electromagnetic characteristics, Super DC Tape manufactured by Fuji Photo Film Co., Ltd. was used.

Overwriting characteristics were examined using a drum tester by the following method. At a relative speed of a TSS head (head gap, 0.2 μm; track width, 14 μm; saturation flux density, 1.1 T) of 10.2 m/sec, signals of 1/90 Tb (λ=22.5 μm) were recorded at the optimum recording current determined from the input/output characteristics of signals of ½ Tb (λ=0.5 μm), and signals of ½ Tb were then written thereover. From the degree of erasion of the recorded 1/90 Tb signals, the overwriting characteristics were determined.

Magnetic characteristics were determined in the direction parallel to the orientation direction with a sample-vibrating magnetometer (manufactured by Toei Kogyo CO., LTD.) at an intensity of external magnetic field of 5 kOe. SQ means a squareness ratio. The content of high-Hc components was determined as follows. A magnetic recording medium sample was set on the sample-vibrating magnetometer manufactured by Toei Kogyo CO., LTD., in such a manner that the orientation direction for the sample was the same as the direction of magnetic field. A magnetic field of −10 kOe was applied to bring the sample into DC saturation, and the magnetic field was then returned to zero to measure the residual magnetization (−M$_{rmax}$). A magnetic field of 3,000 Oe was applied in the opposite direction, and the magnetic field was then returned to zero to measure the residual magnetization Mr. Thereafter, a magnetic field of 10 kOe was applied to bring the sample into DC saturation in that opposite direction, and the magnetic field was then returned to zero to measure the residual magnetization M$_{max}$. The content of high-Hc components was calculated from the thus-obtained residual magnetization values using the following equation.

$$\text{High-Hc component (\%)} = 100 \times (M_{rmax} - M_r)/(M_{rmax} - (-M_{rmax}))$$

Although the magnetic field applied in that opposite direction can have any preferred intensity, an intensity of 3,000 Oe was employed herein from the standpoint of detection sensitivity. The high-Hc components are components which undergo reversal of magnetization at that magnetic field intensity or more.

Surface roughness was measured by examining a sample area 250 μm square with light-interference three-dimensional roughness meter "TOPO-3D," manufactured by WYKO CO., LTD. (Ariz., U.S.A.). In calculation from the found values, corrections such as slope correction, sphere correction, and cylinder correction were conducted according to JIS-B601. The center-line average roughness R$_a$ was taken as the value of surface roughness.

TABLE 3

| | Production Example | Hc (Oe) | SQ | Bm (G) | SFD | High Hc Component (%) | Surface Roughness (nm) | Output (dB) | C/N (dB) | Overwriting Characteristics |
|---|---|---|---|---|---|---|---|---|---|---|
| Example 1-1 | 1-1 | 2010 | 0.85 | 3850 | 0.43 | 7 | 2.4 | 2.2 | 3.3 | 1.5 |
| Example 1-2 | 1-2 | 2176 | 0.85 | 4030 | 0.42 | 9 | 2.5 | 3.3 | 4.2 | 2.6 |
| Example 1-3 | 1-3 | 2350 | 0.84 | 4170 | 0.45 | 13 | 2.6 | 4.0 | 4.3 | 4.8 |
| Example 1-4 | 1-4 | 2400 | 0.84 | 4240 | 0.45 | 13 | 2.5 | 4.4 | 4.7 | 5.0 |
| Example 1-5 | 1-5 | 2250 | 0.86 | 4150 | 0.40 | 12 | 2.6 | 3.6 | 4.1 | 4.3 |
| Comparative Example 1-1 | 2-1 | 1850 | 0.78 | 3450 | 0.56 | 10 | 3.2 | 0.5 | −0.5 | 2.5 |
| Comparative Example 1-2 | 2-2 | 1990 | 0.77 | 3550 | 0.57 | 15 | 3.1 | 0.9 | 0.2 | 5.7 |
| Comparative Example 1-3 | 2-3 | 1860 | 0.81 | 3480 | 0.58 | 11 | 3.3 | 0.4 | −0.6 | 2.7 |
| Comparative Example 1-4 | 2-4 | 1970 | 0.81 | 3450 | 0.58 | 15 | 3.2 | 0.8 | 0.3 | 5.4 |
| Comparative Example 1-5 | 2-5 | 2130 | 0.80 | 3560 | 0.59 | 17 | 3.3 | 0.6 | 0.1 | 6.9 |
| Comparative Example 1-6 | 2-6 | 2090 | 0.80 | 3700 | 0.61 | 17 | 3.3 | 0.6 | 0.1 | 7.5 |
| Comparative Example 1-7 | 3-1 | 1940 | 0.84 | 3500 | 0.59 | 14 | 3.8 | 0.4 | −1.2 | 4.4 |
| Comparative Example 1-8 | 3-2 | 2210 | 0.83 | 3750 | 0.62 | 21 | 3.9 | 0.8 | 0.5 | 8.8 |

EXAMPLE 2

Magnetic recording media having no nonmagnetic layer were produced as follows.

A magnetic recording medium for Example 2-1 was produced in the same manner as in Example 1, except that the composition for magnetic-layer formulation shown in Example 1 which had been prepared using the ferromagnetic metal powder produced in Production Example 1-3 was applied on the nonmagnetic support at a thickness of 1.5 μm. A magnetic recording medium for Example 2-2 was produced in the same manner, except that the ferromagnetic metal powder produced in Production Example 1-5 was used. These media were evaluated in the same manner as in Example 1, and the results obtained are shown in Table 4.

TABLE 4

| | Production Example | Hc (Oe) | SQ | Bm (G) | SFD | High Hc Component (%) | Surface Roughness (nm) | Output (dB) | C/N (dB) | Overwriting Characteristics |
|---|---|---|---|---|---|---|---|---|---|---|
| Example 2-1 | 1-3 | 2300 | 0.83 | 4070 | 0.42 | 9 | 2.8 | 3.0 | 3.2 | 7.0 |
| Example 2-2 | 1-5 | 2190 | 0.85 | 4060 | 0.41 | 12 | 2.9 | 2.8 | 2.9 | 6.5 |

Ferromagnetic metal particles which have a high coercive force and an excellent coercive-force distribution even though the average major axis length of the contour particles is as short as from 0.05 to 0.12 μm unlike conventional ones can be produced by using a starting material with good uniformity in particle size, by controlling the number of metal nuclei during the formation thereof so that the average number of crystallites per contour particle becomes from 2.0 to 5.0, and by regulating the aspect ratio of the crystallites to from 1.0 to 2.0.

The magnetic recording medium containing such ferromagnetic metal particles is excellent in short-wavelength output and C/N and has excellent overwriting characteristics due to its excellent coercive-force distribution.

While the invention has been described in detail and with reference to specific embodiments thereof, it will be apparent to one skilled in the art that various changes and modifications can be made therein without departing from the spirit and scope thereof.

What is claimed is:

1. A magnetic recording medium comprising a nonmagnetic support having provided thereon at least a magnetic layer containing ferromagnetic metal particles, wherein the magnetic layer have a coercive force of 2,000 to 3,000 Oe and a Bm of 3,800 to 5,500 G;

the ferromagnetic metal particles has an average major axis length of 0.05 to 0.12 μm and an average aspect ratio of 4.0 to 10.0;

the average number of crystallites constituting the ferromagnetic metal particles per particle is from 2.0 to 5.0; and the crystallites has an average aspect ratio of 1.0 to 2.0.

2. The magnetic recording medium as claimed in claim 1, wherein the ferromagnetic metal particles have a coercive force of 1,800 to 3,000 Oe and a σs of 130 to 165 emu/g.

3. The magnetic recording medium as claimed in claim 1, wherein the ferromagnetic metal particles comprise iron and Co and have a coercive force of 1,900 to 2,500 Oe and a σs of 130 to 165 emu/g.

4. The magnetic recording medium as claimed in claim 1, wherein a nonmagnetic layer mainly comprising inorganic nonmagnetic particles and a binder is provided between the nonmagnetic support and the magnetic layer.

5. The magnetic recording medium as claimed in claim 1, wherein the magnetic layer and the nonmagnetic layer are coated by wet-on-wet coating.

* * * * *